N. WATSON.
PIPE-CUTTING MACHINE.

No. 190,798. Patented May 15, 1877.

WITNESSES:
C. Neveux
J. H. Scarborough

INVENTOR:
N. Watson
BY Munn
ATTORNEYS.

UNITED STATES PATENT OFFICE.

NEHEMIAH WATSON, OF ARCADIA, RHODE ISLAND.

IMPROVEMENT IN PIPE-CUTTING MACHINES.

Specification forming part of Letters Patent No. 190,798, dated May 15, 1877; application filed April 23, 1877.

*To all whom it may concern:*

Figure 1:
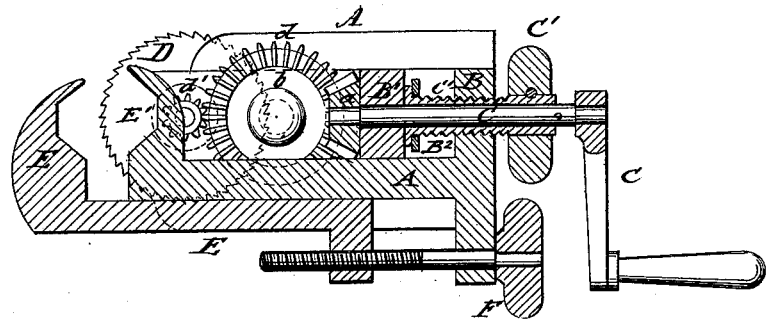
Figure 2:
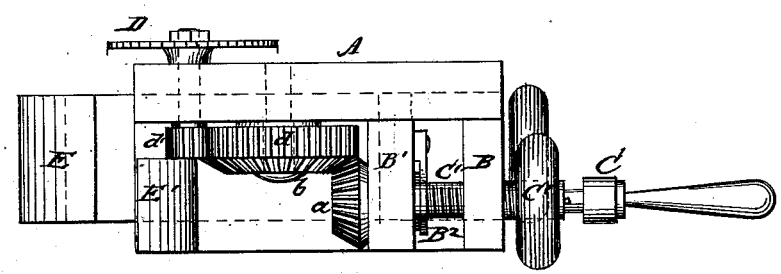
Figure 3:
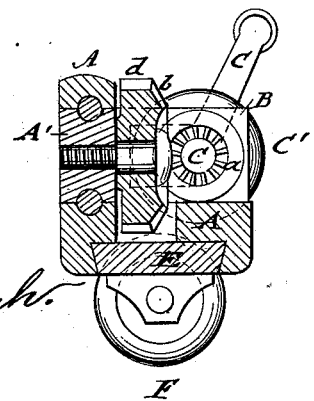

Be it known that I, NEHEMIAH WATSON, of Arcadia, in the county of Washington and State of Rhode Island, have invented a new and Improved Pipe-Cutting Machine, of which the following is a specification:

In the accompanying drawing, Figure 1 represents a vertical longitudinal section of my improved machine for cutting steam and gas pipes. Fig. 2 is a top view, and Fig. 3 a vertical transverse section of the same.

Similar letters of reference indicate corresponding parts.

The object of this invention is to furnish for practical plumbers and repairers of steam and gas pipes an improved machine that is capable of cutting off steam, gas, and water pipes in the smallest space and with the same degree of perfection as if done in the shop, the device being small and portable, and applied without destroying any parts of the pipes, elbows, &c., as by the present mode.

The invention consists, essentially, of a revolving circular saw, capable of cutting iron, and of a clamp for grasping the pipe and holding the machine in place during the forward feeding and cutting of the saw.

In the drawing, A represents the main frame of my improved pipe-cutting machine, and B B¹ are, respectively, a fixed-end cross-bar and a movable cross-bar, which carry the longitudinal crank-shaft C.

The crank-shaft imparts, by a bevel-wheel, a, at its end, intermediate bevel-wheel b, cog-wheel d, and a pinion, d', revolving motion to a lateral shaft, at whose outer end a circular saw, D, is applied, that is parallel to the longitudinal axis of the main frame, and revolved by the turning of crank-shaft and by the intermeshing gear.

The main frame A slides, by a dovetail-bottom recess, on the bar of a clamping-jaw, E, which, together with a jaw, E', at the end of frame A, and a thumb-screw, F, passing through projections of the jaw-bar and main frame, is applied with considerable power to the pipe or other object to be cut, so as to be able to resist the strain exerted thereon during the cutting process. The thumb-screw is so located near the crank as to be accessible in whatever position the machine may be placed.

The feed or progressive motion of the saw through the pipe during the cutting motion is obtained by turning a thumb-screw, C', which, in its turn, moves a section, A', of the main frame, to which the saw, gear, and crank-shaft are connected. This section or bar A' slides in longitudinal guide-slots of the side bar of frame A, so as to admit the forward motion of the saw while the main frame is rigidly clamped to the pipe.

The thumb-screw C' encircles the crank-shaft C, bears, by its end or head, on the movable cross-piece B¹, and engages a fixed collar, B², of the same, for the purpose of carrying the saw back after use.

The crank may be removed and replaced by a ratchet or a bit-brace to suit the convenience of the operator.

The machine may be used with great advantage in cutting out a piece of pipe for the insertion of a T to connect another service-pipe. The exact length may be removed without taking out the pipe, leaving the ends as round and perfect as if cut on a lathe. It may also be used for cutting off iron rods or bolts, effecting a saving in time, tools, material and labor.

Having thus described my invention, I claim as new and desire to secure by Letters Patent—

1. The combination, in a pipe-cutting machine, of an adjustable clamping-frame, with a longitudinally-feeding and revolving circular cutting-saw, substantially in the manner set forth.

2. The combination of the main frame, attached by clamp-jaws and thumb-screws to the pipe to be cut, with a circular revolving saw applied to a longitudinally-sliding and guided section, A', of the main frame, and moved by a feeding thumb-screw, C', substantially in the manner specified.

3. The combination of the sliding and guided bar A' of frame A, carrying cutting-saw, operating gear, and crank-shaft, with a feeding-thumb-screw, C', around crank-shaft, cross-bar B¹, and collar-plate B², substantially as and for the purpose described.

NEHEMIAH WATSON.

Witnesses:
THOMAS W. MORGAN,
ANSON GREENE.